United States Patent [19]

Gleason

[11] Patent Number: 5,091,777
[45] Date of Patent: Feb. 25, 1992

[54] DOCUMENT MONITOR

[75] Inventor: Michael E. Gleason, Allentown, Pa.

[73] Assignee: Bell & Howell Phillipsburg Company, Allentown, Pa.

[21] Appl. No.: 667,333

[22] Filed: Mar. 11, 1991

[51] Int. Cl.$^5$ ............................................... H04N 7/18
[52] U.S. Cl. ......................................... 358/93; 270/58
[58] Field of Search ......................... 358/93, 101, 106; 270/58

[56] References Cited

U.S. PATENT DOCUMENTS

| | | | |
|---|---|---|---|
| 2,122,918 | 7/1938 | Phinney | 358/93 |
| 2,294,809 | 9/1942 | Smith | 358/93 |
| 3,194,880 | 7/1965 | Weingart | 358/93 |
| 3,490,761 | 1/1970 | Bell | 270/58 |

*Primary Examiner*—Howard W. Britton
*Attorney, Agent, or Firm*—Griffin Branigan and Butler

[57] ABSTRACT

A document monitor for viewing and reading of at least heading portions of bank statements upon occurrence of an error condition during processing of bank statements and associated checks in the preparation of mailing to bank customers in inserted mechinery comprises a video camera disposed beneath a raceway of an inserted machine, the camera being directed upwardly through a transparent window in the inserter raceway to view a bank statement that is disposed face down in the above the window, the statement being conveyed along the raceway during normal operation of the inserter machine. The document monitor further comprises means for illuminating of the state face from beneath and a video monitor screen can be easily seen by an operator. The video monitor is appropriately electronically interconnected with the camera in order to display an image of the bank statement's face seen thereby. Upon occurence of a processing error, there is displayed upon the monitor at least the bank statment's heading portion, which is otherwise not directly viewable without removal of the statement from the raceway or disassembly of a portion of the processing equipment.

7 Claims, 2 Drawing Sheets

DOCUMENT MONITOR

BACKGROUND

1. Field of the Invention

This invention relates generally to document monitors for monitoring document processing, and more specifically to a novel document monitor device that facilitates viewing and reading by an operator of not directly viewable bank statements during document processing, in particular, for instance, in a bank statement inserter machine used for the preparation of mailings of statements and associated checks to bank customers.

2. Prior Art and Other Considerations

Various bank statement processing machines are employed for high-volume preparation of mailings to bank customers. The mailings need to include the appropriate statement in association with thereto corresponding checks and often other documents. For instance, a bank statement processing machine is disclosed in U.S. Pat. No. 3,490,761.

In general, processing of checks requires particular reliability in the operation of processing equipment, in view of the strict need to preserve confidentiality. For example, checks destined for a specific bank customer should not be included by mistake with statements in mailings to another customer, and all checks corresponding to a bank statement should accompany the respective statement in the proper mail package. In view of the continually increasing need for handling and processing of higher quantities of mailings at high speeds and high throughput rates, reliability and speed requirements are becoming more and more stringent while the market simultaneously demands constantly increasing throughput rates.

In spite of the increasing sophistication of respective equipment, malfunctions occur, and even a rare malfunction or error of improper association of documents in a bank statement mailing is highly undesirable, particularly if it continues and sometimes proliferates unchecked, as is apt to happen in high-volume processing. Sophisticated error detection devices and methods have been employed to annunciate the occurrence of processing errors and/or to interrupt processing to permit an operator to resolve the problem. A common class of errors that can occur in processing of bank statement mailings involves association of wrong checks and statements, or missing checks in respect to the content of particular statements being processed for a mailing.

Whereas generally employed error detection devices and methods provide for error annunciation and often also for automatic stopping of processing machinery operation upon occurrence of an error, determination of the type of error and its cause and rectification thereof usually requires an operator to disassemble a portion of the machinery. Bank statement processing machines include inserters which bring together checks and other inserts in correlated manner with associated statements and bring these documents together for common insertion into an envelope for mailing to each particular customer.

In many bank statement processing machines, for good and important reasons, customers' statements are fed face down, particularly prior to and while being brought together with corresponding checks. Statements and checks are thusly assembled by deposition of the checks in face-up orientation onto a statement for subsequent common insertion into an envelope. Errors of the aforementioned kind are commonly detected at the locations of these operations. Therefore, it is desirable for an operator to be able to view and read statements at these locations upon occurrence of errors. However, such statements are readable only from thereunderneath, unless the statements are removed from the machinery. Consequently, the operator needs first to gain access to and view and read the particular documents involved in an error situation in order to determine specifically what kind of error has occurred and what kind of corrective action to take. In the past, reading of the information on the face of bank statements by the operator has required removal of the (face-down) statement from the machine racetrack and/or access to internal regions of the machine, which generally involved disassembly and opening up of portions of the machinery and, hence, has resulted in substantial processing equipment downtime.

Video cameras have been employed in inserter machinery in the past to monitor delivery of inserts to inserting stations in the course of normal operation.

The document monitor device of the present invention alleviates difficulties of the aforementioned kind and significantly reduces processing equipment downtime due to processing errors by providing video monitoring facilities for an operator to view and read documents processed in face-down orientation in document processing machines; specifically upon occurrence of error conditions. In particular, the document monitor device of the invention is useful for thusly monitoring bank statements during occurrences of error conditions in operation of bank statement machines without need for removal of bank statements from the raceway or for disassembly of portions of the machine.

Accordingly, an important overall feature of the invention is the provision of a document monitor in a bank statement processing machine, including an inserter, the machine brings together checks and other inserts in correlated manner with an associated statement and assembles these documents for common insertion into an envelope for mailing to a particular bank customer, the bank statement processing machine being of the type in which statements are fed with at least the heading portion face down along a raceway prior to and during assembly with associated checks. In particular, an important overall feature of the invention is the provision of a bank statement monitor and a method of monitoring and viewing, upon occurrence of error conditions, at least a bank statement's heading portion that is otherwise not directly viewable without removal of the statement from the raceway or disassembly of a portion of the processing equipment.

SUMMARY

In accordance With principles of the present invention, a document monitor is provided in form of a video camera and a therewith associated video monitor for viewing and reading of at least heading portions of bank statements upon occurrence of an error condition during processing of bank statements and associated checks in the preparation of mailings to bank customers in inserter equipment.

The document monitor comprises a video camera that is disposed beneath a raceway of an inserter machine and that is directed generally upwardly through a transparent window in the raceway to view at least the heading portion of a bank statement that is disposed face down in the location of the window on or above the raceway, the bank statement being conveyed along the raceway during normal operation of the inserter machine. The document monitor further comprises means for illumination of the bank statement face from beneath and through the window and a video monitor that is positioned above the raceway so that its screen can be easily seen by an operator. The video monitor is appropriately electronically interconnected with the camera in order to display the image seen thereby, in particular the image of the bank statement's face.

The location of the transparent window is in the vicinity of or at the location where a check feeder delivers checks onto the thereto corresponding bank statement that is being conveyed along the raceway toward an inserter section.

Briefly, in operation of the document monitor, upon ocurrence of an error condition, the bank statement machine is stopped and the operator reads information from the bank statement that is displayed upon the monitor screen, such as for example the customer's name, the account number, and sometimes also the number of checks associated with the particular statement. The operator may need to inch the machine cycle to provide appropriate registration of the statement above the window.

In order specifically to determine the type of error that has occurred, the operator now can visually compare the account number on the checks with the account number on the statement and take corrective action without having to open the machinery. If, for example, there is a mismatch in the number of checks, the operator can try to feed further checks from the check feeder; and, if that does not correct the matter, the operator can initiate execution of a diversion sequence for the stack of checks involved, together with the particular statement without opening the check feeder and without removing the assembly of statement and checks. If, for example, the error lies in one customer's checks being deposited upon another customer's statement, there is probably a misalignment problem which Can be corrected on the spot. The equipment is started up again after appropriate corrective action has been taken.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

DESCRIPTION OF PREFERRED EMBODIMENTS

Figure 1:
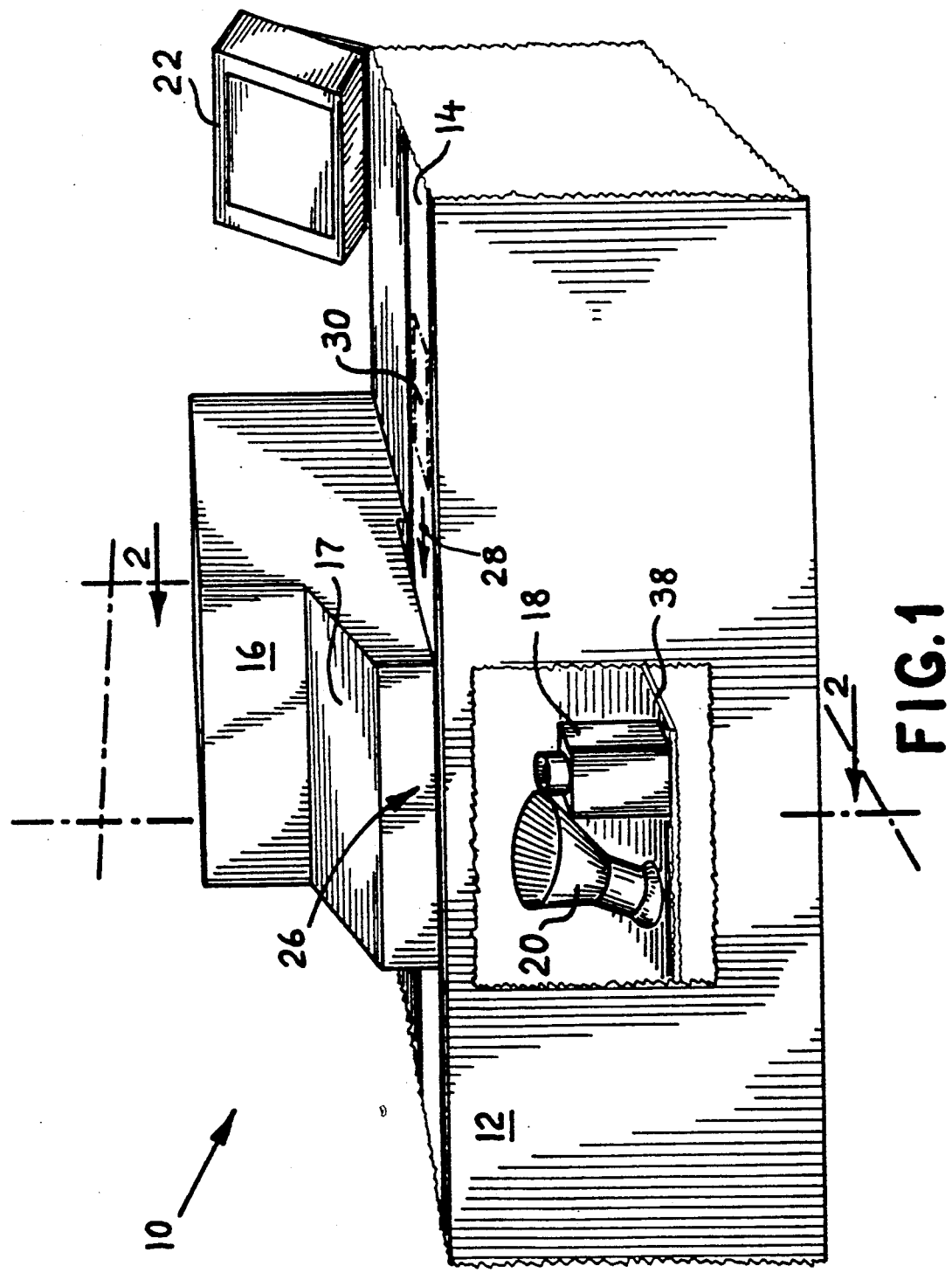
FIG. 1 is a schematic perspective front view of a portion of a bank statement processing machine including an embodiment of the document monitor of the invention; and, FIG. 2 is a schematic illustration of a partial transverse elevational section along section plane 2—2 through a portion of the bank statement processing machine depicted in FIG. 1.
Figure 2:
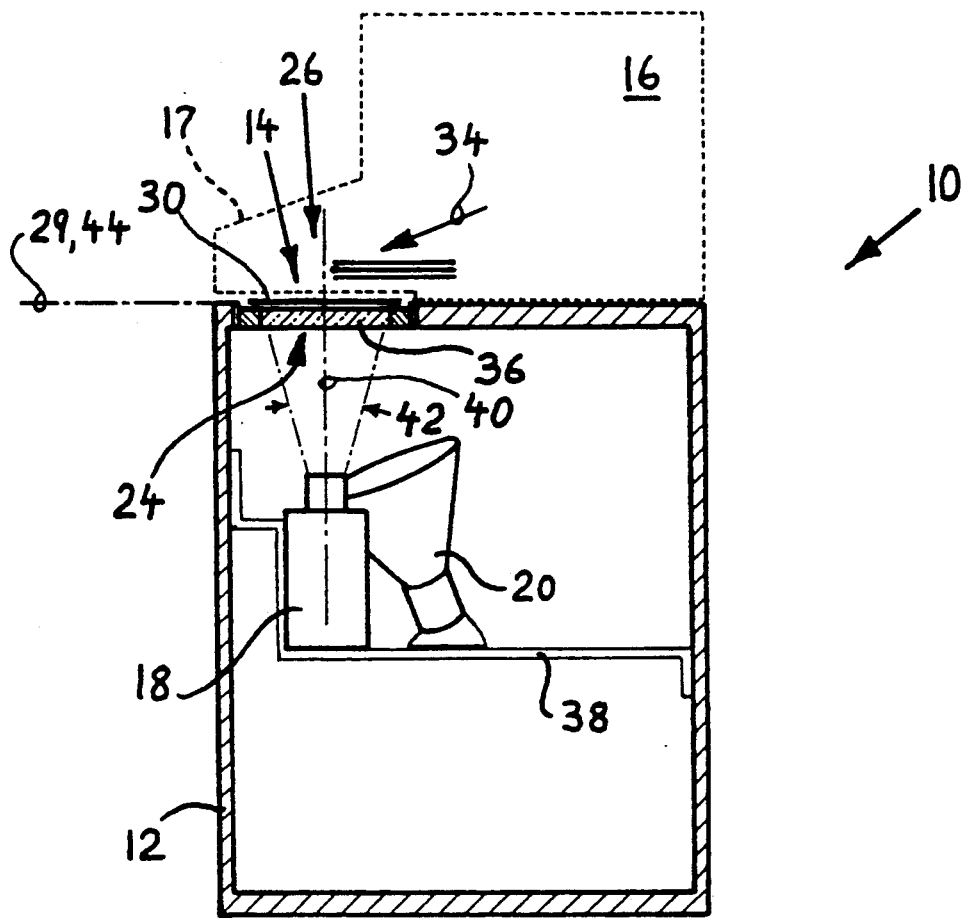

Referring now to the illustrations in FIGS. 1 and 2, there is shown a portion of a bank statement processing machine 10 (part of mail inserter machinery) including a document monitor device of the invention. The portion of the bank statement machine 10 includes a console 12, a raceway 14, and a check feeder 16. The document monitor device comprises a video camera 18, illumination means 20, a video monitor 22, and an opening 24 in raceway 14 at an assembly location 26. Assembly location 26 is located beneath the front portion of the check feeder 16 in the region of raceway 14.

Raceway 14 is disposed substantially horizontally in the upper level of console 12 and extends beyond the shown fragment of console 12 on both sides thereof. Raceway 14 is operative in conveying documents thereupon and therealong in the direction of arrow 28 in a conveying plane 29. An example of such a conveyed document is a bank statement 30 that is shown by phantom lines in FIG. 1 and by a solid line in FIG. 2. Bank statement 30 is conveyed print-face down, as is customary in many such machines. In some situations the bank statement is folded, but at least the heading portion of the statement faces downwardly and is viewable through opening 24.

Check feeder 16 is shown in FIG. 2 by dotted outline only. Check feeder 16 customarily includes a singulator that feeds predetermined numbers of checks from a stack and accumulates a package of checks for further delivery. For example, FIG. 2 shows a package 32 of checks as it is being delivered by check feeder 16 in a general direction indicated by arrow 34. Package 32 is deposited onto the bank statement 30 at assembly location 26, the checks being deposited in face-up orientation. Check feeder 16 is provided with uncovering means 17 for easy operator access to the checks. In situations when the bank statement 30 is a folded document, package 32 can be alternately deposited or nested into a fold thereof. A statement onto which a thereto corresponding check package has been deposited by the check feeder 16 is then conveyed in the form of this assembly on and by raceway 14 toward the left (FIG. 1) along console 12 to further portions of the bank statement machine. Generally such further portions perform inserter functions, wherein the statement and check assembly are inserted into envelopes and prepared for mailing.

Opening 24 in raceway 14 can be simply a cut-out open region and, as shown in FIG. 2, such an opening can be provided with a transparent window 36. Window 36 serves to keep dust and other debris from falling through opening 24 onto camera 18, illumination means 20, and other components located in console 12.

Video camera 18 and illumination means 20 are located within console 12 and are mounted, for example, to the console structure by a mounting platform 38. Camera 18 defines an optical viewing path 40 and a viewing angle 42 through its lens. Optical viewing path 40 is directed through opening 24 (respectively through window 36) and the camera is focussed at object plane 44 that coincides with the conveying plane 29. Bank statement 30 is disposed in object plane 44. Camera 18 is operative in acquiring an image of the lower surface of bank statement 30. Illumination means 20 is shown, for example, as a reflector lamp that directs light through opening 24 (respectively window 36) at the bottom surface of the bank statement 30.

Video monitor 22 is disposed above console 12 in an appropriate location so that an operator standing in front of the console 12 in the area of check feeder 16 can comfortably view the monitor screen. Video monitor 22 displays the image that has been acquired by video camera 18.

As shown, optical viewing path 40 is a straight upwardly-directed path. It should be understood that camera 18 can be alternately mounted in different orientations and locations to those shown. In the latter situations, the optical viewing path would be folded by means of mirrors so that it will be a straight path no longer. Similarly, illumination through opening 24 can be provided via a folded path.

Bank statement machines generally have provisions for detecting and annunciating processing errors occurring in assembly of statements and corresponding checks. Bank statement machine 10 is of this type.

In operation of the document monitor device, upon annunciation of a processing error in the operation of the bank statement machine in assembling of statements and corresponding checks, the machine is either already automatically stopped or the operator stops the machine and reads customer identifying information from the image of at least the heading portion of the involved bank statement displayed on video monitor 32. The identifying information generally includes the customer's name and his account number. The operator then compares this read information with corresponding identifiers printed on the corresponding checks which the operator can access and read easily by opening up of uncovering means 17 of check feeder 16. Means 17 can be a lid or it can be an easily removable or hingeable upper front portion of feeder 16. Uncovering means 17 alternately can be a transparent window allowing reading of the topmost check in a check package without removal of means 17.

For instance, if the identifiers on the topmost check do not match the identifying information of the corresponding statement, the operator immediately has a key clue to the nature of the error. The operator can then look at other checks in the package more closely to determine the extent and kind of error. The latter can also involve manually counting of the number of checks actually present in the package and comparing this count with the check count number printed on the statement that is also seen in the displayed monitor image without a need for the operator to remove the statement from the machine.

In respect to the latter, for example, if there is a mismatch in the number of checks only, the operator can try to feed further checks from the check feeder by inching the feeder; and, if that does not correct the matter, the operator can initiate execution of a diversion sequence for the assembly of statement and check package involved - in either case without disassembling the check feeder. If, for example, the error lies in one customer's checks being deposited upon another customer's statement, there is probably a misalignment problem which can be corrected on the spot. The equipment is started up again after appropriate corrective action has been initiated by the operator.

While the invention has been particularly shown and described with reference to preferred embodiments thereof, it will be understood by those skilled in the art that various changes and modifications in form and details may be made therein without departing from the spirit and scope of the invention.

The embodiments of the invention in which an exclusive property or privilege is claimed are defined as follows:

1. A document monitor for viewing and reading by an operator of at least heading portions of bank statements upon occurrence of an error condition during processing of the bank statements and of associated checks in the preparation of mailings to bank customers in mail inserter machinery, the mail inserter machinery including
   a console;
   a raceway disposed substantially horizontally in and along an upper level of said console, the upper surface of said raceway defining a conveying plane therealong, said raceway having an assembly location for checks and bank statements, said raceway being operative in conveying the bank statements thereupon and therealong in said conveying plane in print-face down orientation; and,
   a check feeder disposed at said assembly location for feeding checks on top of the bank statements while the bank statements are located at said assembly location, the document monitor comprising:
   an opening in said raceway at said assembly location;
   a video camera disposed beneath said raceway in said console, said camera having an optical viewing path defining an object plane at which said camera is focussed, said viewing path being directed through said opening, said object plane being disposed in said conveying plane, said video camera being operative in acquiring an image of a bank statement while the particular bank statement is located at said assembly location in said object plane;
   means for illuminating bank statements through said opening while the bank statements are located at said assembly location, said means for illuminating being disposed in said console beneath said raceway; and,
   a video monitor disposed above said console for easy viewing by the operator, said video monitor being operative in displaying images acquired by said video camera.

2. The document monitor according to claim 1, wherein said opening includes a transparent window that extends substantially across the entire area of s id opening.

3. The document monitor according to claim 1, wherein said optical viewing path is a straight path that is directed substantially upwardly from said video camera.

4. A document monitor in a bank statement machine of the type having a raceway and an assembly location in a location therealong, said bank statement machine being of the type in which customer statements are fed face down along and upon said raceway and checks corresponding to said customer statements are delivered face up onto said statements at said assembly location for assembly of said statements with said checks, said bank statement machine being of the type that detects and annunciates processing errors in assembling of said checks with said statements, the document monitor comprising:
   an opening in said raceway at said assembly location;

a video camera disposed beneath said raceway, said video camera having an optical viewing path defining an object plane at which said camera is focussed, said viewing path being directed upwardly through said opening, said object plane being disposed in said conveying plane, said video camera being operative in acquiring an image of a bank statement while the particular bank statement is located at said assembly location in said object plane;

means for illuminating bank statements through said opening while the bank statements are located at said assembly location, said means for illuminating being disposed beneath said raceway; and, a video monitor disposed above said raceway for easy viewing by an operator, said video monitor being operative in displaying images acquired by said video camera.

5. The document monitor according to claim 4, wherein said opening includes a transparent window that extends substantially across the entire area of said opening.

6. A method of monitoring documents in a bank statement machine of the type effecting a step of assembling a customer statement that is fed print-face down along a raceway with checks corresponding to said customer statement, said checks being deposited face up onto said customer statement at an assembly location of said raceway, said step of assembling including detecting and annunciating of processing errors in said assembling, the method comprising steps of:

illuminating at least the heading portion of the printed face of said customer statement from a region beneath said raceway through a window therein, said window being located in the region of said assembly location;

acquiring a video image of said heading portion by video camera means disposed beneath said raceway along an optical path that is upwardly directed toward said customer statement through said window;

displaying said video image on a video monitor that is located above said raceway so that said image cane be easily seen and read by an operator;

reading customer account identifying information from said image on said video monitor upon annunciation of a processing error in said step of assembling, said reading being performed by said operator;

comparing said identifying information with identifiers on said checks and determining the nature of said processing error, said comparing and determining being performed by said operator;

initiating corrective action to correct said processing error, said initiating being effected by said operator.

7. The method according to claim 6, wherein said step of reading includes reading of statement information specifying the number of corresponding checks associated with said statement, and wherein said step of comparing includes comparing the number of specified corresponding checks with the actual number of checks assembled in said step of assembling.

* * * * *